3,403,093
PRODUCTION OF POWDERED ASPHALT
King L. Mills, Bartlesville, Okla., assignor to Phillips Petroleum Company, a corporation of Delaware
Filed Aug. 30, 1965, Ser. No. 483,762
8 Claims. (Cl. 208—39)

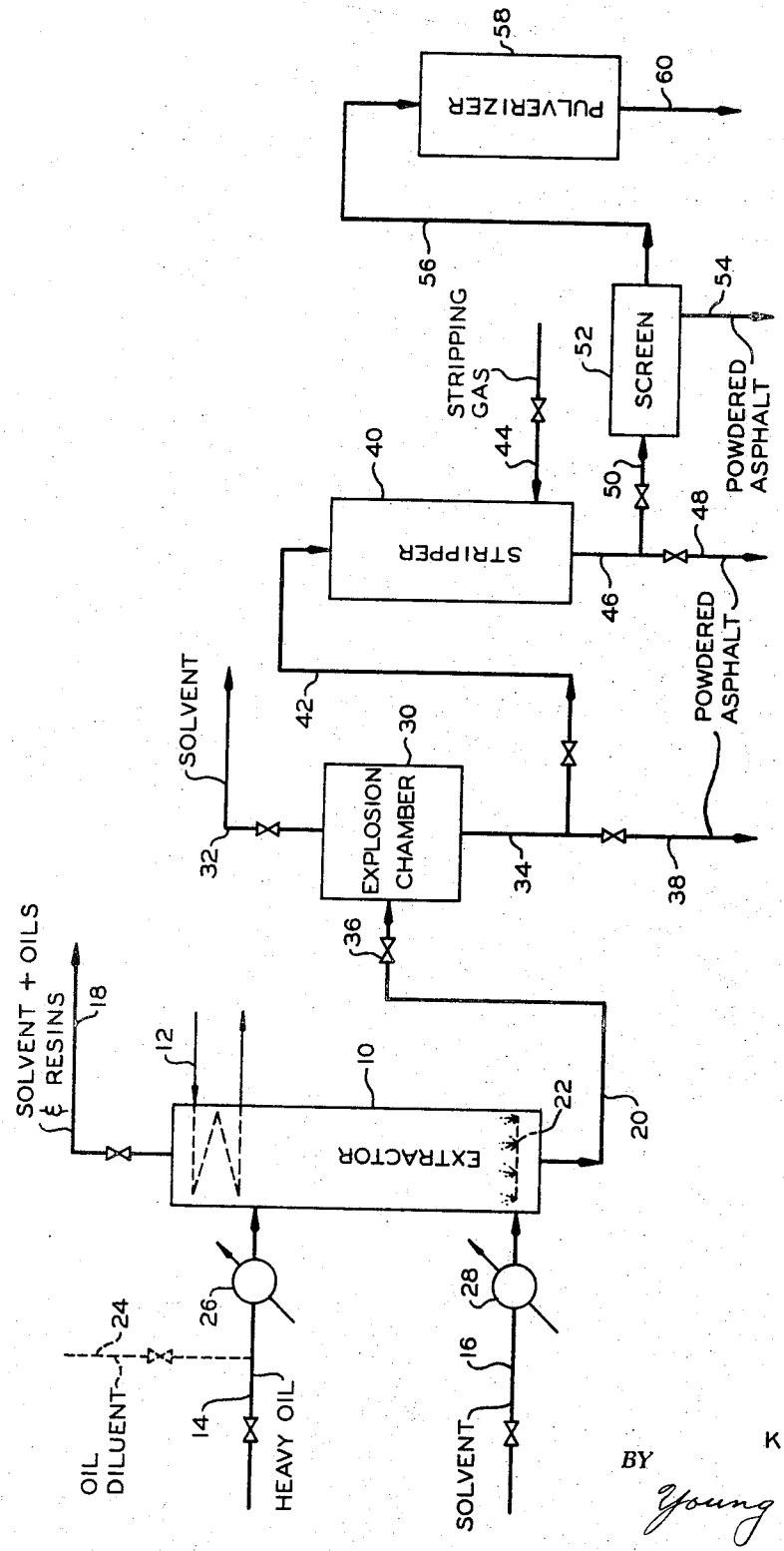

ABSTRACT OF THE DISCLOSURE

Powdered asphalt is produced from a feed of heavy hydrocarbon material containing asphalt by solvent extracting the feed material under an elevated pressure to form a solvent-rich extract phase consisting of solvent, oil, and resins and a raffinate phase consisting of high melting point residual asphaltic materials containing dissolved solvent, recovering the asphaltic residue containing a substantial amount of solvent under a pressure of at least 300 p.s.i.g., and suddenly releasing the pressure on the recovered asphaltic residue to about atmospheric so as to explode same with instantaneously evaporating solvent.

---

This invention relates to a process for producing powdered asphalt from heavy hydrocarbon materials containing asphalt.

Powdered asphalt has a number of uses. It may be used as a fuel; it may be mixed with sawdust, compressed, and heated to produce wallboard; it may also be used in the smelting of iron ore by briqueting the powdered asphalt and iron ore with or without lime.

Up to this time, powdered asphalt has been made by grinding or otherwise comminuting asphalt to a fine powder. This invention is concerned with an improved method of producing powdered asphalt.

Accordingly, it is an object of the invention to provide a process for producing asphalt in powdered form. Another object is to provide a method of producing powdered asphalt which is more economical than methods heretofore known. A further object of the invention is to provide an economical process for producing powdered asphalt which utilizes surplus low cost raw materials. Other objects of the invention will become apparent to one skilled in the art upon consideration of the accompanying disclosure.

A broad aspect of the inventoin comprises subjecting a selected heavy hydrocarbon material containing asphaltic constituents to solvent extraction so as to form a solvent-rich extract phase consisting of solvent, oil, and resins and a raffinate phase consisting of high melting point residual asphaltic materials containing dissolved solvent, recovering the asphaltic residue containing a substantial amount of solvent under a pressure under a pressure of at least 300 p.s.i.g., and injecting the residual asphaltic material containing solvent into an explosion zone maintained under substantially ambient (atmospheric) pressure whereby the suddenly vaporizing solvent explodes the asphalt to form a dry powdered material.

The hydrocarbon feed to the process comprises asphaltic bituminous materials containing resins, oils, and asphaltenes of substantially higher molecular weight than the resins and oils. Materials coming in this category include steam or vacuum reduced residue from crude oil, cracking residue, oxidized air-blown asphalt; catalytically oxidized air-blown asphalt, native asphalt, asphaltites (gilsonite), topped crude oil, reduced crude oil, coal tars and pitches, and tars and pitches obtained in the extractive distillation of peat, lignite, shales, wood, and similar organic matter.

The asphalt containing feed is subjected to solvent extraction with a light aliphatic hydrocarbon of 3 to 6 carbon atoms per molecule including propane, butane, isobutane, pentane, isopentane, hexane, isohexane, and similar known solvents used in de-asphalting, and mixtures thereof.

The process may be effected batch-wise or continuously. In batch-wise operation, the hydrocarbon feed is mixed with the solvent and agitated for a substantial period after which the undissolved material is recovered at an elevated temperature and pressure and subjected to instantaneous vaporization of the solvent at atmospheric pressure whereby the asphalt material explodes into a fine powder. However, it is preferred to operate the process continuously as in conventional de-asphalting. In this type of process the hydrocarbon feed containing asphaltic materials is passed downwardly thru an ascending stream of solvent in an upright column or extraction zone maintained at elevated temperature and pressure above 300 p.s.i.g. so as to extract a substantial proportion of the oils and resins from the hydrocarbon material leaving a substantial concentration of oils and resins in the undissolved asphaltic materials which are removed from the bottom of the column. The solid asphaltic material containing a substantial concentration of solvent while at substantially the pressure and temperature maintained in the extraction step is injected into an explosion zone maintained substantially at atmospheric pressure to form the dry powdered asphalt, most of the solvent evaporating instantaneously during this step.

A more complete understanding of the invention may be had by reference to the accompanying schematic drawing which is a flow sheet illustrating a preferred embodiment of the invention.

Referring to the drawing, an upright extraction column 10 is provided with a heater 12 in an upper section thereof, a hydrocarbon feed line 14 entering the column just below heater 12, a solvent feed line 16, an overhead line 18 for solvent and extracted oils and resins, and bottoms outlet line 20 for withdrawal of undissolved, asphaltic materials. Column 10 also is provided with a sparger or similar distribution means 22 for dispersion of solvent in the bottom section of the column. Line 24 is connected with line 14 for injection of oil diluent into the asphaltic hydrocarbon feed when desired. Lines 14 and 16 are provided with heaters 26 and 28, respectively.

Line 20 leads into explosion chamber 30 which is maintained at low pressure (substantially atmospheric) and is provided with a solvent take-off line 32 and a solids take-off line 34. The reduction of pressure between line 20 and explosion chamber 30 is effected by means of a pressure reducing valve 36 which causes ejection of solvent-containing asphaltic solids into chamber 30 at a controlled rate.

Dry powdered asphalt may be removed from line 34 via line 38 and allowed to stand in contact with air until traces of solvent disappear from the powder. It is preferred to strip the powdered material of residual solvent vapors and for this purpose stripper 40 is provided and connected with line 34 by means of transfer line 42. Stripper 40 is supplied $O_2$-free inert gas thru line 44 which connects with a suitable source of gas such as a blower or compressed gas tank. Stripped powdered asphalt is removed from stripper 40 via line 46 and may be passed either thru line 48 to storage, packaging, or transportation facilities, or it may be passed thru line 50 to screening device 52 which removes any coarse granular material from the powdered material, the powdered material being withdrawn thru line 54 nad the coarse granular material being transferred via line 56 to a pulverizer 58. The pulverized material withdrawn thru line 60 may be combined with the powdered asphalt recovered from line 54.

The pressure in extractor 10 is sufficiently high to maintain the solvent in liquid phase, preferably in the range of 300 to 650 p.s.i.g., so that the drop in pressure downstream of valve 36 and particularly in explosion chamber 30 is from the selected pressure in this range to substantially atmospheric pressure.

The asphaltic hydrocarbon feed and the solvent in lines 14 and 16, respectively, are preheated to a temperature near the operating temperature in column 10. Heater 12 is operated to maintain a higher temperature in the upper section of the column so as to drive some of the dissolved materials out of the solvent to provide some refluxing in the column. Heater 12 may comprise a steam coil connected with a source of steam, an electric heater, or any other suitable heater for this purpose.

When utilizing certain asphaltic materials as feed, it may be necessary to add oil thru line 24 which is substantially below the insoluble asphaltenes in molecular weight. Such oils may be recovered from the stream in line 18 as extracted oils from the process and recycled to line 24. The function of the added oil is to increase the solvent power of the solvent introduced thru line 16. The process is controlled so as to maintain a weight ratio of resins and oils to asphaltenes in the bottoms stream of asphalt in line 20 in the range of 8:1 to 1:1 and, preferably, 3:1 to 2:1. When the oil and resin content is higher than this maximum range, the recovered material does not form a dry powder which maintains its identity at atmospheric temperature but tends to agglomerate and form a mass of asphalt.

When using propane as the solvent, the column is operated so as to maintain a temperature differential between the top and bottom of the column of about 20° F., an operable range for the bottom of the column being 110 to 170° F. and 130 to 190° F. for the top of the column. It is feasible with some feeds to operate as low as 90° F. in the bottom of the column. The broad range of temperature is in the range of about 90° F. up to the critical temperature of the selected solvent and the pressure would be maintained about 50 p.s.i.g. above the vapor pressure of the solvent at the operating temperature.

For each volume of feed introduced thru line 14, from 3 to 12 volumes of solvent are injected thru line 16. The proportions of asphalt and solvent in line 20 range from 0.9 to 0.05 volume of asphalt and 0.9 to 0.05 volume of solvent. It is preferred to operate so that the solvent and asphalt in line 20 are approximately equal in volume.

To illustrate the invention, a dry powdered asphalt containing only a minor proportion of granular material needing further comminution was produced from 0.8 volume of residual crude oil to which 0.2 volume of extracted oil was added. The feed stream of residuum and added oil was heated to a temperature of 115° F. and was introduced substantially as shown in the drawing to the extractor. Six volumes of propane was heated to 110° F. and introduced to the bottom of the extractor. The extractor was operated at 400 p.s.i.g. with a bottom temperature of 110° F. and a top temperature of 130° F. The bottoms stream in line 20 contained 0.11 volume of asphalt and an equal volume of propane. The overhead stream in line 18 contained 5.89 volumes of propane and 0.89 volume of oil and resins extracted from the feed.

Certain modifications of the invention will become apparent to those skilled in the art and the illustrative details disclosed are not to be construed as imposing unnecessary limitations on the invention.

I claim:

1. A process for producing dry powered asphalt from an asphalt-containing heavy hydrocarbon material which comprises the steps of:
    (1) passing said material downwardly thru a deasphalting zone in contact with an ascending stream of a $C_3$ to $C_6$ aliphatic hydrocarbon solvent at a temperature of at least 90° F. and below the critical temperature of the solvent and a pressure in the range of 300 to 650 p.s.i.g. at least about 50 p.s.i.g. above the corresponding vapor pressure of the solvent so as to extract oils and resins from said material;
    (2) controlling the conditions of said deasphalting zone to produce an insoluble asphalt material in which the weight ratio of oils and resins to asphaltenes is in the range of 8:1 to 1:1;
    (3) recovering the insoluble asphalt, containing liquid solvent, from the bottom section of said zone substantially at said temperature and pressure;
    (4) exploding the asphalt of step (3) by injecting same into an explosion zone maintained substantially at ambient pressure whereby the suddenly vaporizing solvent explodes said asphalt; and
    (5) recovering the powdered asphalt of step (4).

2. The process of claim 1 wherein the asphalt-containing material is admixed with from 10 to 100 vol. percent of an oil of substantially lower molecular weight than the asphaltenes in the recovered asphalt of step (2).

3. The process of claim 2 using an oil recovered from the overhead solvent from step (1) and wherein the ratio of oils and resins to asphaltenes in step (2) is in the range of 3:1 to 2:1.

4. The process of claim 1 wherein the heavy hydrocarbon feed to the process is a topped crude oil.

5. The process of claim 1 wherein the heavy hydrocarbon fed to the process is residuum.

6. The process of claim 1 wherein the heavy hydrocarbon fed to the process is tar.

7. The process of claim 1 wherein the heavy hydrocarbon fed to the process is pitch.

8. The process of claim 1 using propane as the solvent and reducing the ratio of oils and resins to asphaltenes to the range of 3:1 to 2:1.

References Cited

UNITED STATES PATENTS

| | | | |
|---|---|---|---|
| 2,896,261 | 7/1959 | McAffe | 264—9 |
| 2,131,205 | 9/1938 | Wells et al. | 208—44 |
| 2,383,535 | 8/1945 | Dickinson et al. | 208—45 |
| 2,500,757 | 3/1950 | Kiersted | 208—45 |
| 2,862,869 | 12/1958 | Illman | 208—23 |
| 2,894,904 | 7/1959 | Hardman et al. | 208—45 |
| 3,053,751 | 9/1962 | Garwin | 208—45 |
| 3,159,571 | 12/1964 | Reman et al. | 208—39 |

DANIEL E. WYMAN, *Primary Examiner.*

P. E. KONOPKA, *Assistant Examiner.*